United States Patent [19]

Yagi et al.

[11] Patent Number: 4,924,474
[45] Date of Patent: May 8, 1990

[54] LASER DEVICE WITH HIGH OSCILLATION EFFICIENCY

[75] Inventors: Shigenori Yagi; Yasuhito Myoi; Masaki Kuzumoto; Kazuki Kuba; Yoshito Seiwa; Toshitaka Aoyagi; Yutaka Mihashi, all of Hyogo, Japan

[73] Assignee: Mitsubishi Denki Kabushiki Kaisha, Tokyo, Japan

[21] Appl. No.: 308,586

[22] Filed: Feb. 10, 1989

[30] Foreign Application Priority Data

| Feb. 10, 1988 | [JP] | Japan | 63-29205 |
| Mar. 24, 1988 | [JP] | Japan | 63-70241 |
| Aug. 18, 1988 | [JP] | Japan | 63-205577 |
| Aug. 31, 1988 | [JP] | Japan | 63-217621 |

[51] Int. Cl.$^5$ ............................................. H01S 3/091
[52] U.S. Cl. ................................... 372/75; 372/72
[58] Field of Search ................................ 372/72, 75

[56] References Cited

U.S. PATENT DOCUMENTS

| 3,624,545 | 11/1971 | Ross | 372/75 |
| 3,663,893 | 5/1972 | Ostermayer, Jr. | 372/75 |
| 3,683,296 | 8/1972 | Scalise | 372/75 |
| 3,684,980 | 8/1972 | Kay | 372/75 |
| 3,686,543 | 8/1972 | Nyul | 372/75 |
| 3,711,789 | 1/1973 | Dierschke | 372/75 |
| 4,306,278 | 12/1981 | Fulton et al. | 372/75 |

FOREIGN PATENT DOCUMENTS 0078941 5/1983 European Pat. Off. .
2542833 3/1977 Fed. Rep. of Germany ........ 372/75

OTHER PUBLICATIONS

Allen et al., "Continuous Operation of a YAlG:Nd Laser by Injection Luminescent Pumping"; Appl. Phys. Letters; vol. 14, No. 6, Mar. 15, 69; 188-190.
Copy of European Search Report dated 4/17/89.
Applied Physics Letter, vol. 19, No. 1 (Jul. 1, 1971), p. 11, A. R. Reinberg, et al.
Applied Optics, vol. 27, No. 1 (Jan. 1, 1988), p. 80, F. Hanson et al.
Applied Optics, vol. 13, No. 11 (Nov. 1974), p. 2457, L. C. Conant et al.

Primary Examiner—William L. Sikes
Assistant Examiner—Georgia Y. Epps
Attorney, Agent, or Firm—Sughrue, Mion, Zinn, Macpeak & Seas

[57] ABSTRACT

A laser device comprises a laser medium, a semiconductor light-emitting element for exciting the laser medium, a reflecting surface surrounding the outer periphery of the laser medium along its optical axis, and an opening provided in a part of the reflecting surface for causing light from the semiconductor light-emitting element to be incident upon the laser medium. The laser device is improved further by providing a polarizing plate and a light guide between the light-emitting element and the laser medium and by deviating the optical axis of excitation light from the central axis of the laser medium.

17 Claims, 8 Drawing Sheets

LASER DEVICE WITH HIGH OSCILLATION EFFICIENCY

BACKGROUND OF THE INVENTION

The present invention relates to a laser which is excited by a semiconductor element such as an LD (laser diode) or LED (light-emitting diode), and more particularly to an improvement in the structure for its excitation.

Figure 1:
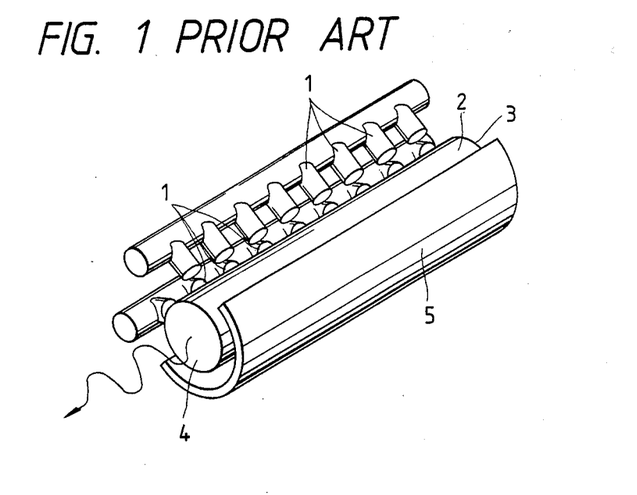
FIG. 1 is a view showing a prior art laser device.

FIG. 1 shows the structure of the prior art LD excited solid state laser, which is disclosed, for example, in U.S. Pat. No. 3,624,545. In the figure, reference numeral 1 denotes an LD; 2 is a laser medium, for example, a YAG rod; 3 and 4 are a totally reflecting film and a partially reflecting film, respectively, formed on end faces of the laser medium 2; and 5 is a reflecting mirror.

An excitation light beam emitted by the LD 1 is caused to be incident upon the laser medium 2, and is absorbed by the medium. The beam that is transmitted through the medium without being absorbed, is reflected by the reflecting mirror 5, and is made incident upon the laser medium 2 once again. Energy of the absorbed light beam is made into an oscillating state by an optical resonator constituted of the partially reflecting film 4 and the totally reflecting film 3, and a part of the energy is emitted toward the outside as laser light beams.

The absorption coefficient of the laser medium 2 for the light from the LD 1 has a large wavelength dependency, which is, for example, 0.75 mm$^{-1}$ for a radiation with wavelength of 808.5 nm and 0.1 mm$^{-1}$ for a radiation of 802 nm. Therefore, it has been necessary to control precisely the spectrum of the LD 1 in order to realize an effective absorption of light by the laser medium.

The prior art laser device is constructed as above, so that it it is difficult for the light from the laser diode to be absorbed completely by the laser medium, and hence the energy efficiency of the laser oscillation remains low.

Further, in the prior art laser device, heat radiation from the laser medium is insufficient so that beam quality is deteriorated as the output increases.

Figure 2:
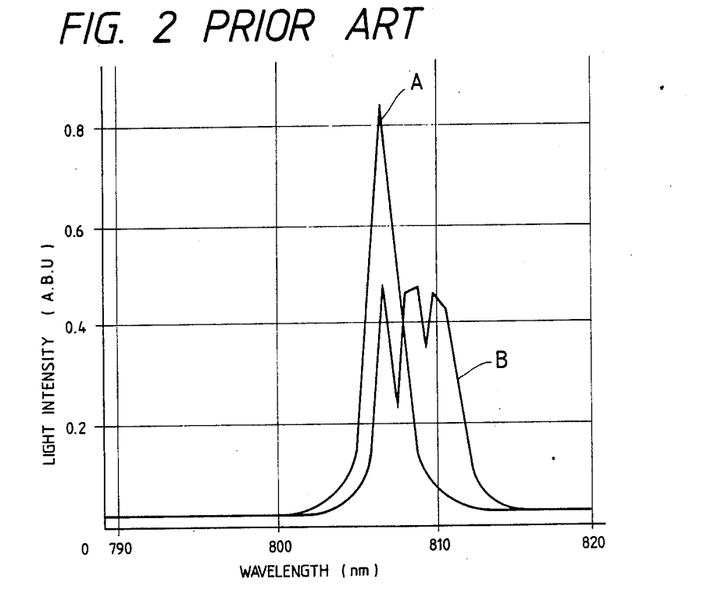
FIG. 2 is a wavelength distribution diagram showing disturbance due to reflected light in the prior art laser device.

Moreover, about 20% of the incident light from the LD 1 is reflected from the surface of the laser medium 2 or the reflecting mirror 5, and reenters the LD1, causing a disturbance to the LD and causing the output and the wavelength of the LD to be varied. FIG. 2 is a wavelength distribution diagram, which shows the disturbance due to reflected light, in which the abscissa is the wavelength of the LD light, and the ordinate is the intensity of the LD light. In the figure, curve A shows the wavelength distribution of the RD 1 when there is no laser medium 2, wherein there is obtained a waveform with a steep peak in the vicinity of 808 nm. Curve B is the wavelength distribution when the laser medium 2 is placed. It can be seen that both of the wavelength and the output of the LD light are disturbed due to the influence of the reflected light from the laser medium 2.

As described above, in addition to the low energy efficiency of the laser oscillation, the prior art laser device has a problem in that the reflected light from the laser medium 2 disturbs the LD 1.

SUMMARY OF THE INVENTION

The present invention is intended to eliminate the above problems of the prior art laser device, and an object of the present invention is to provide a laser device which can improve the energy efficiency of oscillation.

In a laser device according to the first embodiment of the present invention, the outer surface of a laser medium along the optical axis is covered almost completely with a reflecting surface, and a minute opening of the reflecting surface is used as a part through which LD light is incident.

In the first embodiment, most of the outer surface of the laser medium along the optical axis is covered with the reflecting surface, and the minute opening of the surface is used as the part where the LD light is incident upon. Accordingly, the excitation light generated by the LD can be confined and absorbed by the laser medium with high efficiency so that the energy efficiency of laser oscillation can be improved.

A laser device in accordance with the second embodiment of the present invention is arranged so as to cause light generated by a light-emitting element, such as an LD, to be incident on a laser medium through a polarizing plate.

The light from the LD is incident on the laser medium through the polarizing plate, and further through a phase delay element. The light, which is reflected by the laser medium and returned to the polarizing plate, has a phase different from that of the original light so that it cannot go back to the LD since it is obstructed by the polarizing plate, and thus is made to be incident on the laser medium again. Even when the phase delay element is not provided, the amount of light returning to the LD is small, and hence it is possible to improve the oscillation efficiency, and decrease the disturbance to the LD.

A laser device in accordance with the third embodiment of the present invention is constructed so that the optical axis of a semiconductor light-emitting element such as an LD is shifted from a central axis of the laser medium.

In the laser device of the third embodiment, the optical axis of the LD does not pass through the center of the laser medium so that the light from the LD will not be condensed toward the incidence position of the LD light even when it is subjected to the lens action of the laser medium and a reflecting body, and hence the LD light is confined almost completely within the reflecting body. Therefore, absorption coefficient of the laser medium can be increased, and a homogeneous excitation becomes possible due to multiple reflections within the reflecting body.

A laser device in accordance with the fourth embodiment of the present invention is equipped with a light guide which causes light from a semiconductor lightemitting element to be incident obliquely on a laser medium.

In the fourth embodiment, the light guide causes the light from the light-emitting element to be obliquely incident on the laser medium so that the light can be absorbed efficiently by the laser medium, and the energy efficiency of oscillation can be enhanced.

BRIEF DESCRIPTION OF THE DRAWINGS

FIGS. 4 through 6 are views showing the laser device in accordance with the modifications of the first embodiment, respectively.

DETAILED DESCRIPTION OF THE PREFERRED EMBODIMENTS

Embodiments of the present invention will be described with reference to the attached drawings.

Figures 3A, 3B:
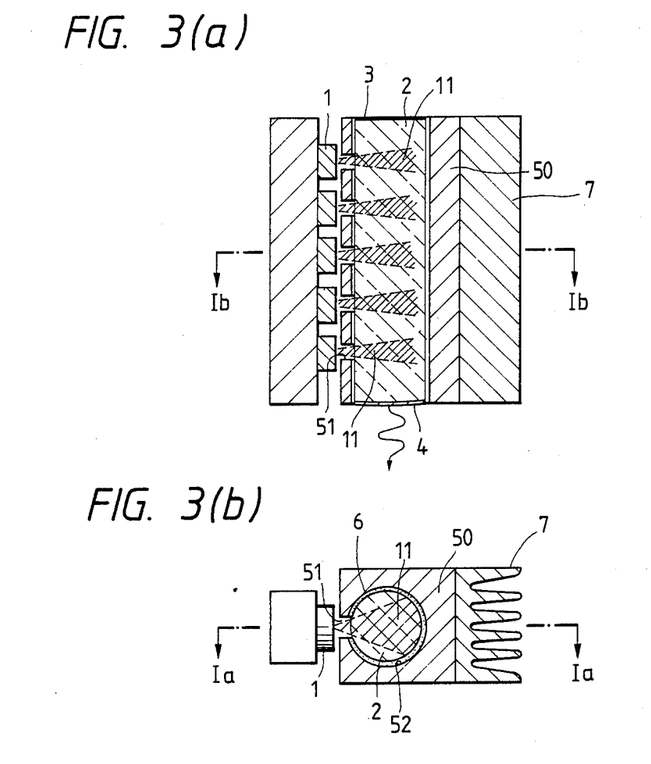
FIGS. 3(a) and 3(b) are a longitudinal crosssectional view and a lateral cross-sectional view showing the laser device in accordance with the first embodiment of the present invention, respectively.

FIG. 3(a) is a longitudinal sectional view, and FIG. 3(b) is a lateral sectional view, respectively, showing a laser device of the first embodiment. In the figures, 50 denotes a reflecting body; 51 is an opening; 52 is a reflecting surface; 6 is a transparent adhesive; 7 is a radiating fin, and 11 is a light beam from an LD 1. The inner surface of the opening 51 is made reflective by covering it with, for example, gold-plating. The reflecting surface 52 is constituted by multi-layered film coating or plating of metal such as gold.

The light beam 11 from the LD 1 is incident upon the laser medium 2 through the opening 51 provided at a part of the reflecting body 50, and is absorbed by the laser medium 2 while it is reflected repeatedly by the reflecting surface 52 of the reflecting body 50, and optically excited by the laser medium 2.

A thin layer of the optically transmissive transparent adhesive 6 provided between the laser medium 2 and the reflecting surface 52 permits the light from the LD to pass effectively while it bonds the laser medium 2 and the reflecting body 50 thermally so that the laser medium is effectively cooled.

Further, the reflecting surface 52 is made optically non-smooth by means of nicking or roughening to prevent the occurrence of parasitic oscillation within the reflecting surface 52.

In the first embodiment, the circumference of the laser medium 2 is surrounded by the reflecting body 50 and the laser beam is arranged to be incident upon the laser medium 2 through the opening 51 provided in a part of the reflecting body 50 so as to cause the light from the LD 1 to be absorbed nearly completely by the laser medium 2, even if the frequency of the light is deviated somewhat from the optimum value. Therefore, the energy efficiency of laser oscillation is remarkably enhanced. Further, in the first embodiment, a heat radiating structure is provided on the outside of the reflecting body so as to cool effectively the laser medium 2 through efficient radiation of heat generated in the laser medium 2 via adhesive 6→reflecting body 50→radiating fin 7. Thus, it becomes possible to suppress deterioration of the beam quality, which is caused with an increase in the output power, and to improve the quality of beams.

Figure 4A:
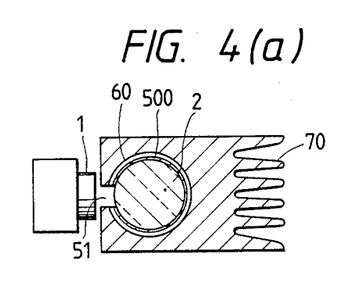
Figure 4B:
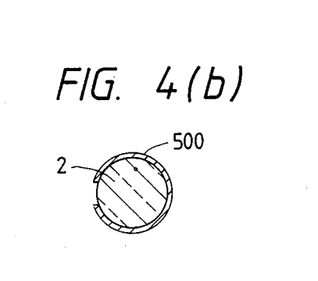

FIGS. 4a-b show a an modification of the first embodiment wherein FIG. 4(a) is a cross-sectional view, and FIG. 4(b) is a view showing just the portion of the laser medium 2 shown in FIG. 4(a). In this modification, a reflecting surface is formed directly on the laser medium 2 as a reflecting film 500, with a thermally conductive filler 60 thermally coupling the reflecting film 500 and a heat radiating body 70.

Figures 5A, 5B, 6:
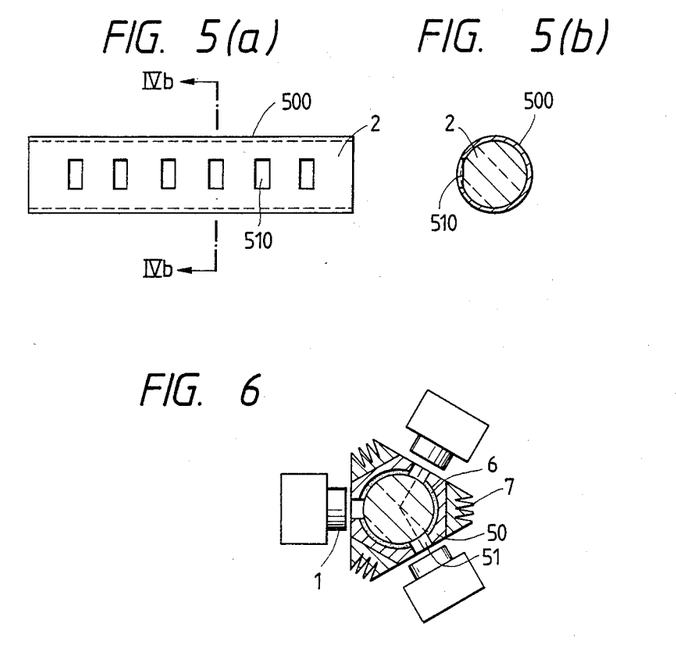

FIGS. 5a-b show a further modification of the modification shown in FIG. 4. In this modification, after covering the entire circumference of the laser medium 2 with the reflecting film 500, a part of the film is cut off to form an opening 510 through which light passes.

In the above-mentioned embodiment and its modifications, light from the LD is incident upon the laser medium at only one direction. However, by setting the direction of light incidence at every 180°, 120°, or the like, beams with more satisfactory symmetry can be obtained. FIG. 6 shows such a modification in which the incidence direction is set at every 120°.

Moreover, the above embodiment and its modifications show the case in which an optical resonator is formed by a partially reflecting film 4, and a totally reflecting film 3 is provided on the respective ends of the laser medium. However, it is of course possible to obtain an optical resonatory by providing both, or either one, of the end faces with an anti-reflection film, and providing a mirror in the exterior. Furthermore, an LED may be used instead of the LD.

As in the foregoing, according to the first embodiment, the outer surface of the laser medium is covered with the reflecting surface, and excitation light from the LD is made to be incident through a gap portion provided in a part of the reflecting surface so that there can be obtained an optical excitation type laser device with high energy efficiency.

Figure 7:
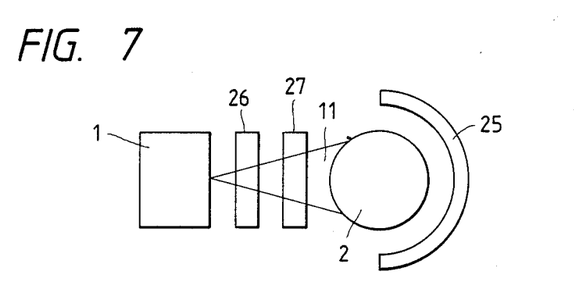
FIG. 7 is a view showing the laser device according to the second embodiment of the present invention.

FIG. 7 shows a laser device of the second embodiment of the present invention. In the figure, 26 denotes a polarizing plate: 27 is a phase delay element, which is a quarter wavelength plate (λ/4 plate) in this embodiment; and 11 is an LD light emitted from an LD 1.

Figure 8A:
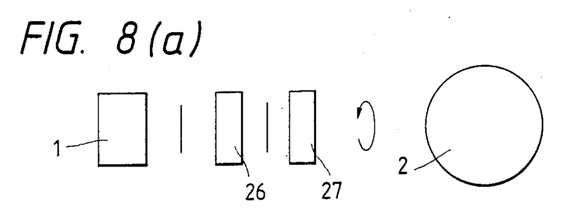
FIG. 8(a) and FIG. 8(b) are explanatory views showing the polarization state for each stage in the laser device according to the second embodiment of the present invention.
Figure 8B:
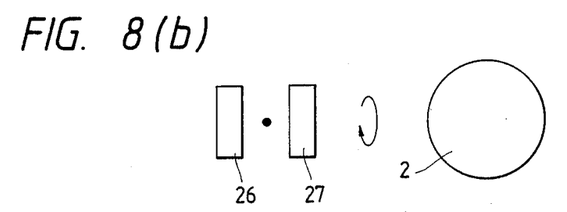

The LD light 11 emitted from the LD 1 is polarized linearly in general, and the polarizing plate 26 is arranged in a direction consistent with the polarization direction of the LD light (direction in which 100% of the LD light is passed through). The polarization state in each stage will be described by making reference to FIG. 8. which (a) shows the change in polarization direction of the emitted light from the LD 1, and to FIG. 8(b) which shows the change in the polarization direction of a reflected light from a laser medium 2. In FIG. 8(a), the LD light linearly polarized in the up-anddown direction along the plane of the paper is incident upon the laser medium 2 as a circularly polarized light after passing through the polarizing plate 26 and the λ/4 plate 27. About 20% of the incident power is reflected from the surface of the laser medium 2, or from a reflecting mirror 25, and the reflected light is in a circular polarization with rotation in the direction opposite to that of the incident light as shown in FIG. 8(b). This light passing through the λ/4 plate 27 arrives at a polarizing plate 26 as a light polarized in the direction perpendicular to the plane of the paper. The polarizing plate 26 is disposed so as to pass light polarized in the up-and-down direction along the plane of the paper, but reflects light polarized in the direction perpendicular to the plane of the paper. Accordingly, the reflected light is reflected again by the polarizing plate 26 and proceeds toward the laser medium 2. Accordingly, the reflected light on the surface of the laser medium 2, which is wasted in the prior art device, can be made to contribute to the excitation again, so that the laser excitation efficiency can be improved. Further, the reflected light does not return to the LD 1 so that disturbance to the LD 1 due to the reflected light can be eliminated.

In the above described embodiment, an example is shown in which the λ/4 plate is used as the phase delay element, however, other phase delay elements may be used, and the similar effect can be obtained by the use of an integral combination of a phase delay element and a polarizing plate.

Moreover, it is possible to use only a polarizing plate (without using a phase delay element) by utilizing phase deviation at the time of reflection, although the effect is reduced somewhat.

Furthermore, in the above embodiment, description has been made for the case of exciting the laser medium 2 from a sidewards direction (so-called side pump type), but the present invention is applied naturally to the end face excitation (so-called end pump type).

As described above, according to the second embodiment, the light, which is emitted from the light-emitting element, is made to be incident upon the laser medium via the polarizing plate to oscillate laser beams so that there can be obtained a stabilized laser device in which the oscillation energy efficiency is increased, and disturbance due to the reflected light to the LD is reduced.

Figure 10A:
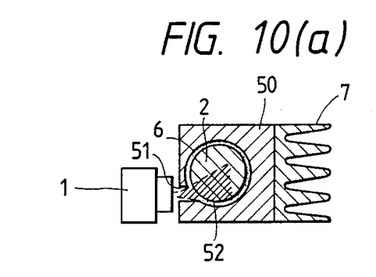
FIG. 10(a) is a lateral sectional view showing the laser device in accordance with the third embodiment of the present invention.
Figure 10B:
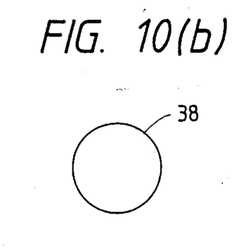
FIG. 10(b) is a view showing the beam shape obtainable by the third embodiment.

FIG. 10(a) and FIG. 10(b) are views showing the third embodiment of the present invention, where FIG. 10(a) is a horizontal sectional view of the laser device and FIG. 10(b) is a view showing the shape of the beam. In FIG. 10a-b, identical symbols indicate identical components as in FIG. 3a-b. In this embodiment, an opening 51 is deviated form the laser medium 2 so as to make light from the LD 1 incident in the direction away from the central axis of the laser medium 2.

The reason for making the opening deviated will be described hereinbelow.

If, in order to maximize the absorption length within the laser medium 2, the light from the LD 1 is radiated toward the center of the laser medium 2 as shown in FIG. 3(b), the laser medium 2 condenses the LD light, acting as a cylindrical lens, and the LD light is subjected further to the condensing action of the reflecting body 50. Denoting the focal lengths of the laser medium 2 and the reflecting body 50 by $f_{YAG}$ and $f_{ref}$, respectively, they are given by $$f_{YAG} = \frac{r_{YAG}}{2} + \frac{n_{YAG}}{n_{YAG} - 1}, \quad (1)$$

and $$f_{ref} = \frac{r_{ref}}{2}, \quad (2)$$

where
$r_{YAG}$: radius of laser medium (YAG rod),
$n_{YAG}$: refractive index of laser medium (for example, 1.82),
$r_{ref}$: radius of reflecting body.

Figure 9A:
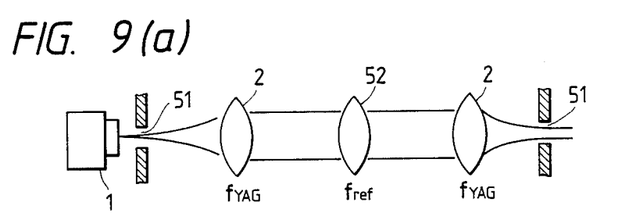
FIG. 9(a) and FIG. 9(b) are views showing the lens effect of the laser medium and the reflecting body respectively.

FIG. 9(a) shows the process in which light emitted through the opening 51 comes back to the starting position. When the light emitted through the opening 51 comes back to its original position, the light undergoes condensing actions at the laser medium 2, reflecting surface 52, and laser medium 2 before it goes out from the opening 51.

Figure 9B:
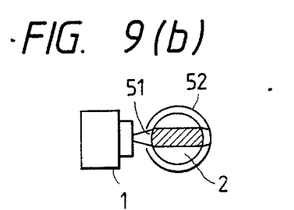

Because of this, absorption of the LD light by the laser medium 2 is limited only in two paths (backward and forward) so that the efficiency of absorption is low. In addition, as shown in FIG. 9(b), the shape of excitation in the laser medium 2 is rectangular, and the laser light taken outside has a rectangular shape corresponding to the excitation distribution.

In the third embodiment, the opening 51 is formed at a position away from the center of the laser medium 2. Accordingly, after the LD light made incident through the opening 51 receives the lens effect of the laser medium 2 and the reflecting surface 51, only a very small portion of its comes back to the opening 51 and the majority of it is reflected by the reflecting surface 52 again to be absorbed by the laser medium 2. The LD light repeats multiple reflections within the reflecting surface 52, and most of its energy is absorbed by the laser medium 2. Accordingly, the absorption coefficient of the laser medium for the LD light is increased, and the excitation in the laser medium 2 becomes homogeneous.

It was confirmed that the beam obtained by the above system has a beam 38 with a substantially ideal circular mode as shown in FIG. 10(b).

Figure 11A:
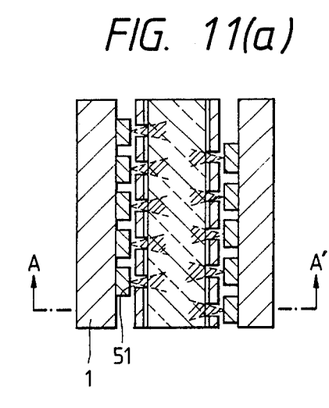
FIG. 11(a) and FIG. 11(b) are a longitudinal sectional view and a lateral section view, respectively, showing a modification of the third embodiment.
Figure 11B:
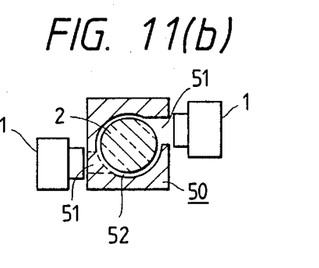

In the above embodiment, the LD light is irradiated from only one side. However, by irradiating the LD light from both sides and symmetrically with respect to the vertical direction as shown in FIGS. 11(a) and 11(b), it becomes possible to perform uniform excitation, and to realize a high density beam by arranging LDs 1 staggered on the left and right sides.

As described above, in the third embodiment, the LD light is made incident with the optical axis shifted from the central axis of the laser medium, so that there can be obtained high efficiency and high quality beams by increasing the absorption coefficient and realizing the homogeneous excitation.

Figure 12:
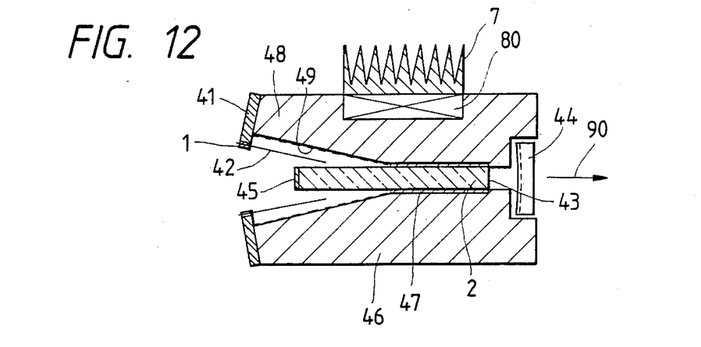
FIG. 12 and FIG. 13 are a lateral sectional view and a longitudinal sectional view, respectively, of the laser device in accordance with the fourth embodiment of the present invention.

FIG. 12 shows a laser device of the fourth embodiment. In the figure, 1 denotes an LD; 41 is a mount; 42 is excitation light; 2 is a laser medium; 43 is AR (anti-reflection) film; 44 is a PR (partially reflecting) mirror; 45 is a TR (totally reflecting) film; 46 is a holder; 47 is a filler; 48 is a light guide; 49 is a reflecting surface; 80 is a cooler; 7 is a radiating fin; and 90 is laser output.

Figure 13:
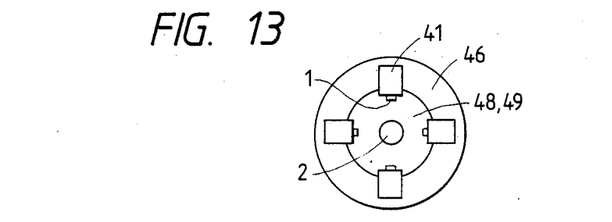

FIG. 13 is a view showing the laser of FIG. 12 as seen from the end face direction. A plurality of LDs 1 are arranged along the circumferential direction as shown in the figure.

Figure 14A:
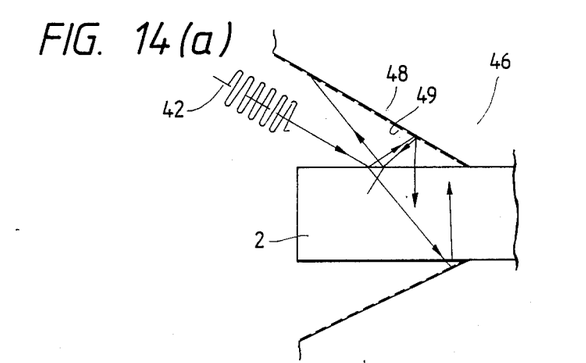
FIG. 14(a) is a view showing the path of the excitation light for the laser of the fourth embodiment.
Figure 14B:
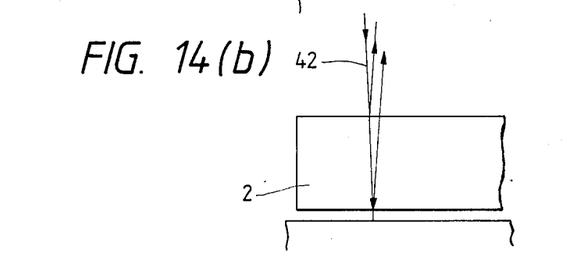
FIG. 14(b) is a view showing the path of the excitation light for the prior art laser.

FIGS. 14(a) and 14(b) are views showing the path of excitation light 42 for the laser device of FIG. 12 and the path of excitation light for the prior art laser device, respectively.

Next, the operation of the device of the fourth embodiment will be described.

The excitation light 42 from the LD 1 is incident obliquely on the laser medium 2. As a result, the length of the light path within the laser medium can be increased (in the figure, it is about 1.4 times that of the prior art device) to be absorbed effectively by the laser medium 2. Further, the excitation light 42 reflected partly (about 20%) by the surface of the laser medium is reflected again by the reflecting surface 49 of the light guide 48 and reenters the laser medium 2 with its direction of propagation changed. The excitation light 42 which repeats a plurality of reflections in the triangular space formed by the surface of the laser medium 2 and the reflecting surface 49 is absorbed almost completely by the laser medium 2. Therefore, even if there is a slight dispersion in the wavelength of the LD light, and hence a dispersion in the absorption coefficient, it becomes possible to excite the laser medium in an effective manner. The excitation light of the LD 1 generally is polarized linearly so that by mounting the LD 1 such that it becomes a P wave as shown in FIG. 14(a), it becomes possible to let the excitation light be absorbed more effectively than in the case of randomly polarized light, circularly polarized light, or a S wave.

In this way, energy absorbed by the laser medium 2 is oscillated in a resonator formed by the TR film 45 and the PR mirror 44, and a part of the energy is taken out as the laser output 90.

Heat in the laser medium 2 flows to the cooler 80 by thermal conduction via the thin filler 47 and the holder 46, and is released eventually from the radiating fin 7. Heat in the LD 1 is also released with high absorption coefficient of the excitation light can further be enhanced by making the filler 47 transparent with respect to the excitation light, and by making the inner surface of the holder 46 a reflecting body.

As described above, in the fourth embodiment, the LD light is made to be obliquely incident on the laser medium, and there is provided the guiding surface which makes the reflected light from the surface of the laser medium to be incident on the laser medium again, and further the angle of mounting the LD is set so as to have the polarization plane of the LD produce a P wave with respect to the laser medium. As a result, there can be obtained a laser device with a high energy efficiency of oscillation. In addition, the construction of this embodiment is capable of cooling the laser medium and the light-emitting element with high efficiency, so that it is possible to obtain a laser device with excellent beam quality.

In the above embodiment, the light guide 48 is formed in a conical form. However, it may be replaced by a cavity type guide with reflecting surface 49, or by an optical fiber. Further, the construction of the mount 41 of the LD 1 may be given various kinds of modification.

Figure 15A:
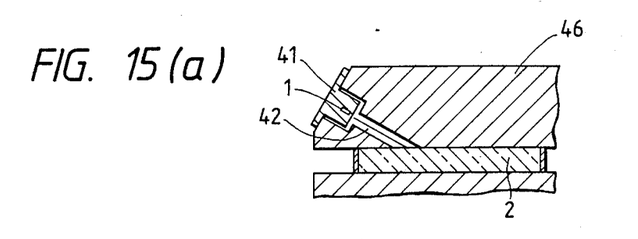
FIGS. 15 through 17 are views showing, respectively, the main part of the modifications of the forth embodiment.
Figure 15B:
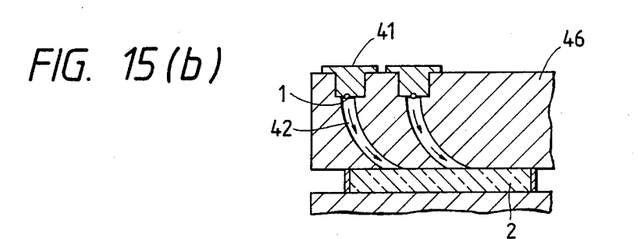
Figure 15C:
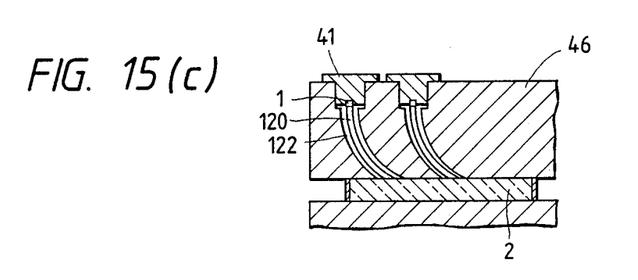

FIG. 15(a), FIG. 15(b), and FIG. 15(c) are views showing main parts of modifications of the forth embodiment. FIG. 15(a) is an example of a straight cavity type, FIG. 15(b) is an example of a bent or curved cavity type, and FIG. 15(c) is an example in which an optical fiber 120 is passed through an optical guide hole 122 to form an optical guide.

Figure 16:
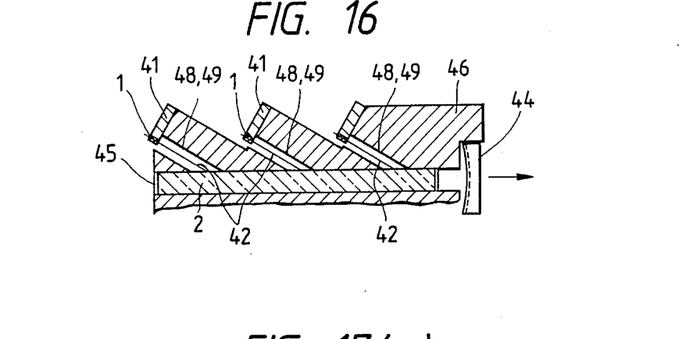

Further, disposition of the LD 1 may be chosen to realize a large output power by arranging a plurality of LDs in the axial direction of the laser medium 2 as shown in FIG. 16.

Figure 17A:
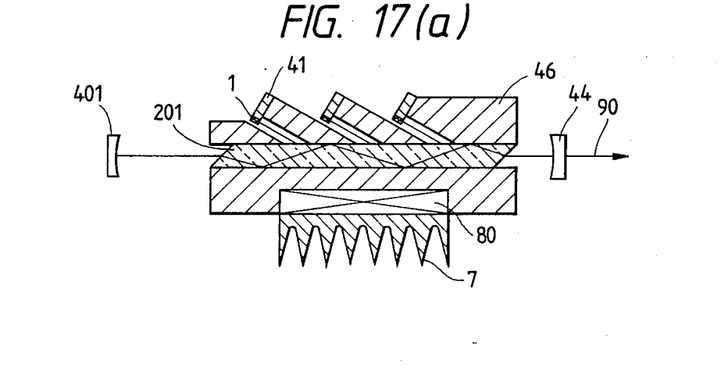
Figure 17B:
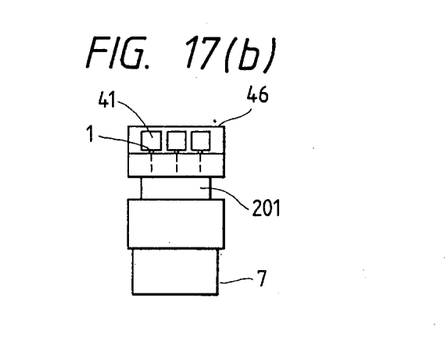

Moreover, in the above embodiments, the laser medium 2 has the shape of a rod. However, the present invention can be effective also for the so-called slab-type laser in which a platelike slab-type laser medium is used, and the laser axis repeats a plurality of internal total reflections. FIG. 17(a-b) show a modification in which the fourth embodiment is applied to the slab-type laser where FIG. 17(a) is its lateral sectional view and FIG. 17(b) is its longitudinal sectional view. IN the figures, 201 denotes a slab-type laser medium, and 401 denotes a TR mirror. As shown in the figures, plural lines each having a plurality of LDs are arranged in the width direction of the slab-type laser medium 201.

As in the foregoing, in the laser according to the fourth embodiment, the light guide is provided which causes the LD light to be incident obliquely on the laser medium so that the optical length in the laser medium is increased, and there can be obtained an effect that the energy efficiency of oscillation is increased.

What is claimed is:

1. A laser device, comprising:
   a laser medium;
   a semiconductor light-emitting element, disposed adjacent said laser medium, for exciting said laser medium directly;
   a reflecting surface surrounding the outer periphery of said laser medium along its optical axis;
   an opening provided in a part of said reflecting surface for causing light from said semiconductor light-emitting element to be incident upon said laser medium.

2. A laser device of claim 1, wherein said reflecting surface is a multi-layered film coating provided on the inner surface of said reflecting body.

3. A laser device of claim 1, wherein said reflecting surface is a metal plating provided on the inner surface of said reflecting body.

4. A laser device of claim 1, wherein said reflecting surface is a reflecting film which is directly provided on said laser medium.

5. A laser device of claim 1, further comprising a transparent adhesive provided between said laser medium and said reflecting body, and a heat radiating means provided on said reflecting body.

6. A laser device of claim 1, further comprising a plurality of semiconductor light-emitting elements, said elements being disposed symmetrically with respect to said laser medium.

7. A laser device, comprising:
   a laser medium,
   a semiconductor light-emitting element for exciting said laser medium;
   a reflecting surface surrounding the outer periphery of said laser medium along its optical axis;
   an opening provided in a part of said reflecting surface for causing light from said semiconductor light-emitting element to be incident upon said laser medium; and
   a polarizing plate provided between said semiconductor light-emitting element and said laser medium.

8. A laser device of claim 7, further comprising a phase delay element provided between said polarizing plate and said laser medium.

9. A laser device of claim 1, wherein said opening is located so that light emitted from said semiconductor light-emitting element is incident upon said laser medium in a direction deviated from a central axis of said laser medium.

10. A laser device of claim 9, further comprising a plurality of semiconductor light-emitting elements, said elements being disposed symmetrically at both sides of said laser medium.

11. A laser device, comprising:
- a laser medium;
- a semiconductor light-emitting element for exciting said laser medium;
- a reflecting surface surrounding the outer periphery of said laser medium along its optical axis;
- an opening provided in a part of said reflecting surface for causing light from said semiconductor light-emitting element to be incident upon said laser medium; and
- a light guide for letting light from said light-emitting element by incident on said laser medium obliquely, said light guide being provided between aid semiconductor light-emitting element and said laser medium.

12. A laser device of claim 11, further comprising a holder for holding said laser medium, a filler provided between said laser medium and said holder, a cooling means provided in said holder, and a heat radiating means provided on said cooling means.

13. A laser device of claim 12, wherein said light guide includes a conical light reflecting surface provides in said holder.

14. A laser device of claim 12, wherein said light guide is a cavity provided in said holder, said light guide having a light reflecting surface.

15. A laser device of claim 12, wherein said light guide is constituted by an optical guide hole provided in said holder, and an optical fiber disposed in said optical guide hole.

16. A laser device of claim 11, further comprising a plurality of semiconductor light-emitting elements, said elements being disposed in an axial direction of said laser medium.

17. A laser device of claim 11, wherein said laser medium is of a plate-like slab type.

* * * * *